United States Patent [19]

Utsumi et al.

[11] 4,416,235
[45] Nov. 22, 1983

[54] IGNITION TIMING CONTROL APPARATUS FOR INTERNAL COMBUSTION ENGINE

[75] Inventors: Hiroo Utsumi, Kariya; Yukio Sakakibara, Anjo; Teruyoshi Ito, Kariya; Kiyokane Kaji; Mitsuyuki Banno, both of Toyota, all of Japan

[73] Assignees: Nippondenso Co., Ltd., Kariya; Toyota Jidosha Kogyo Kabushiki Kaisha, Toyota, both of Japan

[21] Appl. No.: 301,748

[22] Filed: Sep. 14, 1981

[30] Foreign Application Priority Data

Nov. 19, 1980 [JP] Japan .......................... 55-165979[U]

[51] Int. Cl.³ .............................................. F02P 5/04
[52] U.S. Cl. ........................................ 123/425; 73/35
[58] Field of Search ...................... 123/425, 435; 73/35

[56] References Cited

U.S. PATENT DOCUMENTS

| | | | |
|---|---|---|---|
| 4,002,155 | 1/1977 | Harned et al. | 123/425 |
| 4,249,494 | 2/1981 | Guipaud | 73/35 X |
| 4,269,155 | 5/1981 | Iwata et al. | 123/425 |
| 4,290,398 | 9/1981 | Hattori et al. | 123/425 |

Primary Examiner—Tony M. Argenbright
Attorney, Agent, or Firm—Cushman, Darby & Cushman

[57] ABSTRACT

An ignition timing control apparatus for an internal combustion engine comprises a pick-up incorporated in a distributor for detecting a crank angle, a circuit for producing a basic ignition timing indicating signal on the basis of the output signal from the pick-up, a knocking detection circuit for generating a knocking detection signal, a circuit responding to the knocking detection signal and the basic ignition timing indicating signal to generate an actual ignition command signal delayed by a predetermined crank angle from the basic ignition timing, and the control apparatus further includes a circuit responding to these three signals to inhibit the operation of the knocking detection circuit during a period beginning at a time point which precedes to the operation of an inlet valve and an exhaust valve of a cylinder another than the cylinder in concern and terminating at a time point at which a predetermined time has elapsed since the ignition of the cylinder in concern.

6 Claims, 6 Drawing Figures

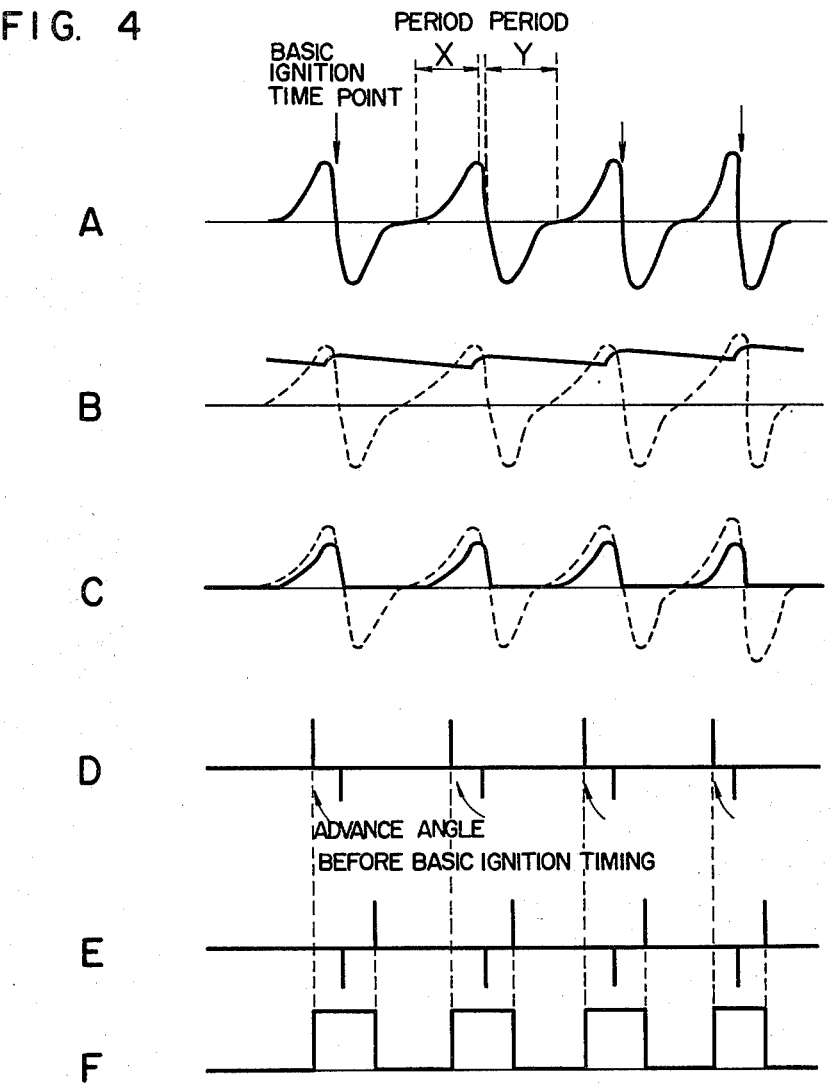
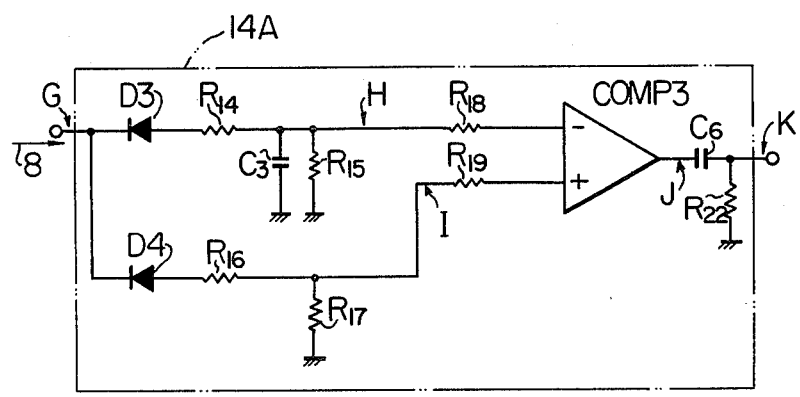

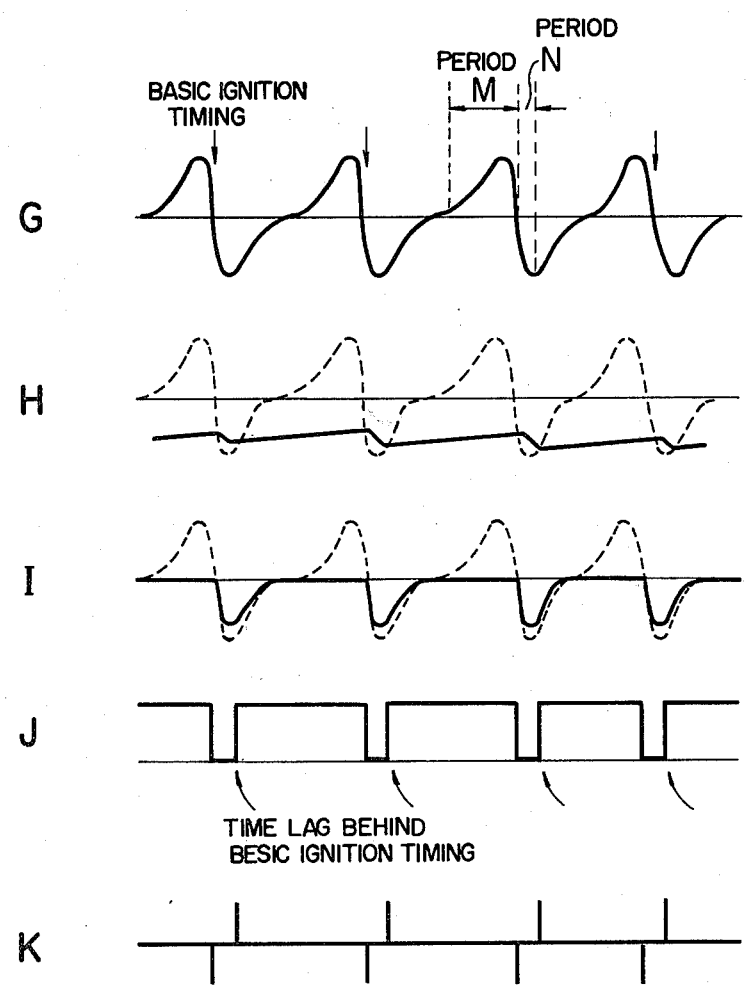

IGNITION TIMING CONTROL APPARATUS FOR INTERNAL COMBUSTION ENGINE

BACKGROUND OF THE INVENTION

The present invention relates in general to knocking control for an internal combustion engine. In particular, the invention concerns an ignition timing control apparatus for an internal combustion engine, which control apparatus includes a masking circuit for inhibiting a knocking detecting operation for a predetermined period beginning at a time point leading a basic ignition timing by a preselected crank angle.

In general, for the knocking control, there is established a so-called masking period during which a knocking detecting operation is inhibited, with a view to preventing a knocking detecting circuit from detecting noise ascribable to ignition erroneously as the knocking signal. The masking period begins at a basic or an actual ignition time point and has a predetermined duration. Although this system is immune to the false detection that the ignition noise produced upon or in succession to ignition is erroneously taken for the knocking signal, there still remains a possibility that those noises which are produced in precedence to the basic ignition timing due to the closing of inlet and/or exhaust valve of a cylinder other than the one in which the ignition is just to take place (this noise is referred to as the valve down noise) may be erroneously detected as the signal ascribable to the knocking. In this connection, with the terminology "basic ignition timing," it is intended to mean the ignition timing which is determined in dependence on the number of rotation and the negative intake pressure of the engine and which corresponds to a time point at which the output signal from the pick-up passes the zero point in transition from the positive to the negative direction in the case of an exemplary embodiment of the present invention, as will hereinafter be described by referring to FIG. 4 at A. It is known that the phase of the output signal of the pick-up is varied in dependence on the rotation number and the intake negative or vacuum pressure of the engine. Further, the terminology "actual ignition timing" is used to mean the time point at which the ignition spark is actually produced with a delay relative to the basic ignition timing due to the fact that the basic ignition timing is modified or corrected to lag by a lag crank angle in dependence on the knocking phenomenon as it occurs.

SUMMARY OF THE INVENTION

An object of the present invention is to provide an improved ignition timing control apparatus for an internal combustion engine in which a continuous masking signal is produced during a predetermined period beginning at a time point which is advanced relative to the basic ignition timing in dependence on the output signal from the pick-up, without resorting to the use of detectors or the like proper to detection of the angular position of the engine crank shaft, thereby to prevent the valve-down noise defined above from being erroneously detected as the knocking signal.

BRIEF DESCRIPTION OF THE DRAWINGS

FIG. 4 shows waveforms of signals produced at various circuit points of the circuit shown in FIG. 3.

FIG. 5 shows an arrangement of the circuit for producing the signal representative of a timing which lags behind the basic ignition timing by a predetermined crank angle.

FIG. 6 illustrates waveforms of signals produced at various circuit points of the circuit shown in FIG. 5.

DESCRIPTION OF THE PREFERRED EMBODIMENTS

In the following, the present invention will be described in detail by referring to the accompanying drawings.

Figure 1:
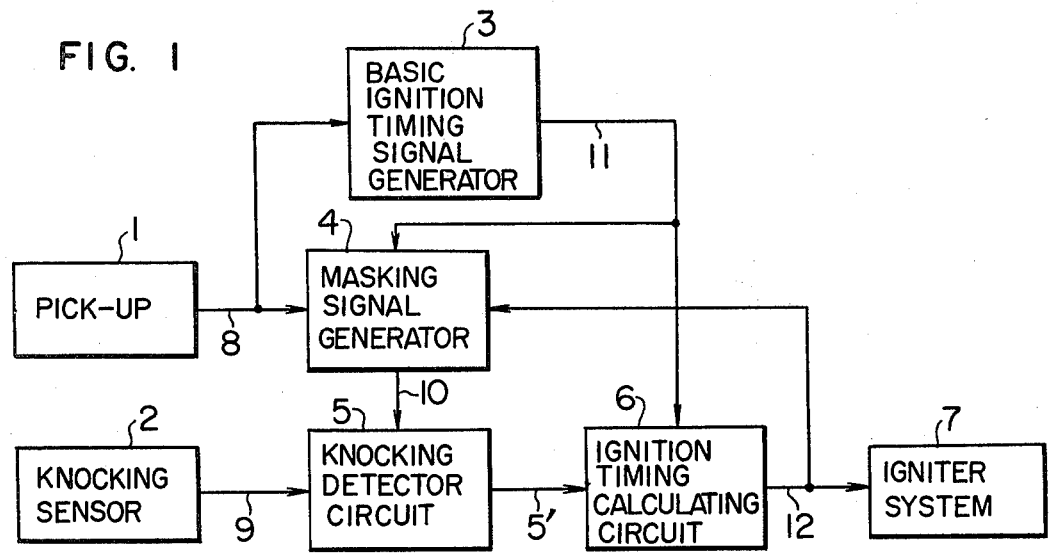
FIG. 1 shows in a block diagram a general arrangement of an ignition timing control apparatus for an internal combustion engine according to an embodiment of the invention.

Referring to FIG. 1 which shows a general arrangement of an ignition timing control apparatus according to an embodiment of the invention, a pick-up 1 is incorporated in a distributor and serves to output a signal at crank positions determined in dependence on a rotation number and a negative intake pressure, for example, of an associated internal combustion engine. More particularly, the pick-up 1 serves to generate an ignition timing reference signal defining the basic ignition timing in cooperation with a mechanical angle advancing means such as a vacuum advancer, a centrifugal governor or the like. The output signal 8 from the pick-up 1 is applied to the input of a masking signal generating circuit 4 together with an actual ignition command signal 12 described hereinafter, whereby a masking signal 10 representative of a masking period is issued from the output of the masking signal generating circuit 4. A knocking sensor 2 produces a sensor output signal 9 which is applied to a knocking detector circuit 5. This circuit 5 serves to detect presence or absence of the knocking phenomenon of the engine continuously except for the masking period during which detection of knocking is inhibited by the aforementioned masking signal. The output signal 5' produced by the knocking detector circuit 5 and representing the presence or absence of knocking is applied to the input of an ignition timing calculating circuit 6 which serves to arithmetically determine the actual ignition timing on the basis of the signal 5' representing the presence or absence of the knocking and a basic ignition timing indicating signal 11 which is produced from a circuit 3, e.g., waveform shaping circuit, adapted to derive the basic ignition timing indicating signal (or the ignition timing reference signal) from the output signal 8 of the pick-up 1 and may have a rectangular waveform after having been shaped by the circuit 3. An actual ignition command signal 12 thus produced from the calculating circuit 6 is applied to an igniter.

Figure 2:
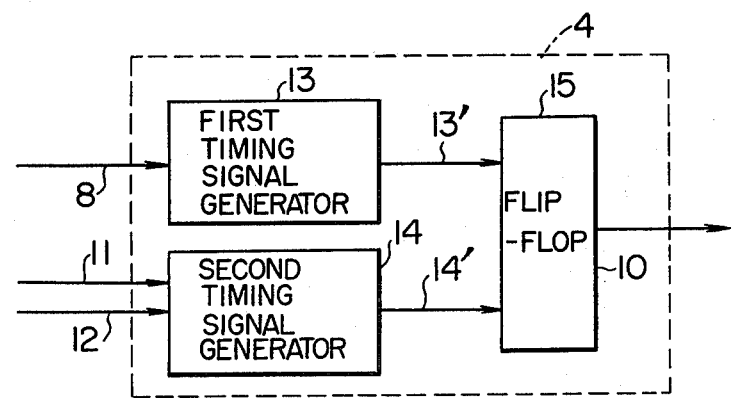
FIG. 2 shows in detail a circuit arrangement of a masking signal generator circuit shown in FIG. 1 and including a circuitry for producing a signal representative of a timing which leads or precedes to the basic ignition timing by a predetermined crank angle.

FIG. 2 shows in detail an arrangement of the masking signal generating circuit 4 described above. This circuit 4 comprises a first timing signal preparing circuit 13 which responds to the pick-up output signal 8 to thereby output a signal 13' (a first timing signal illustrated in FIG. 4 at D) representative of a time point which leads the basic ignition timing by a predetermined crank angle, and a second timing signal preparing circuit 14 which responds to both the basic ignition timing indicating signal 11 and the actual ignition command signal 12 to thereby output a signal 14' (a second timing signal illustrated in FIG. 4 at E) representing a time point at which a predetermined time has lapsed since the occurrence of the actual ignition. On the basis of these signals 13' and 14', the masking signal 10 (illustrated in FIG. 4 at F) is produced by means of a flip-flop circuit 15.

Figure 3:
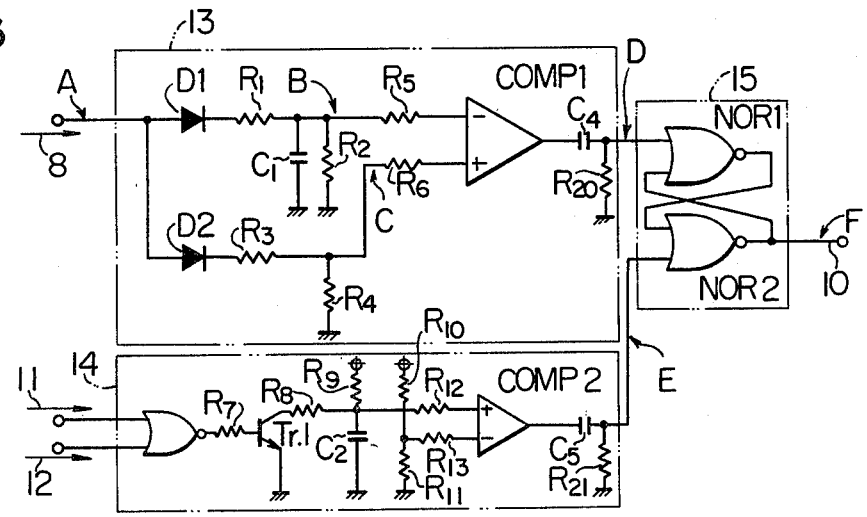
FIG. 3 shows a specific circuit configuration of the masking signal generator circuit shown in FIG. 2.

FIG. 3 shows a specific example of the masking signal generating circuit 4 shown in FIG. 2. The output signal 8 from the pick-up 1 (FIG. 1) is coupled to resistors $R_1$ and $R_3$ through diodes D1 and D2, respectively. The other end of the resistor $R_1$ is coupled to an inverting input terminal of a comparator COMP 1 through a resistor $R_5$. A parallel connection of a capacitor $C_1$ and a resistor $R_2$ is inserted between the earth or ground and a junction between the resistors $R_1$ and $R_5$. The remaining end of the resistor $R_3$ is coupled to a non-inverting input terminal of the comparator COMP 1 through a resistor $R_6$. A resistor $R_4$ is inserted between the earth and a junction of the resistors $R_3$ and $R_6$. A signal resulting from the logic NOR combination of the basic ignition timing indicating signal 11 and the actual ignition command signal 12 is applied to a base electrode of a transistor Tr. 1 through a resistor $R_7$. The transistor Tr. 1 has an emitter grounded to the earth and a collector connected through a resistor $R_8$ to resistors $R_9$ and $R_{12}$ and a capacitor $C_2$. The remaining end of the resistor $R_9$ is connected to a power supply source, while the other end of the capacitor $C_2$ is connected to the ground. The resistor $R_{12}$ has the other end connected to the non-inverting input terminal of the comparator COMP 2. A series connection of resistors $R_{10}$ and $R_{11}$ is inserted between the power supply source and the ground, wherein a junction between the resistors $R_{10}$ and $R_{11}$ is connected to one end of a resistor $R_{13}$ which has the other end connected to the inverting input terminal of the comparator COMP 2. The output terminal of the comparator COMP 1 is connected to one end of a capacitor $C_4$ which has the other end connected to the ground through a resistor $R_{20}$ and at the same time connected to one of the input terminals of a NOR gate labelled "NOR 1." The output terminal of the comparator COMP 2 is connected to one end of a capacitor $C_5$ which has the other end connected to the ground through a resistor 21 and at the same time connected to one of the input terminals of a NOR gate labelled "NOR 2." The gates NOR 1 and NOR 2 constitutes the flip-flop 15. When the pick-up output signal 8 illustrated in FIG. 4 at A is applied to the input of the masking signal generating circuit 13, the diode D1 is rendered conductive during a period or interval X shown in FIG. 4 at A, resulting in that the input signal is charged in the capacitor $C_1$ through a resistor $R_1$. During a period Y shown in FIG. 4 at A, the diode D1 is blocked, as the result of which the electric charge stored in the capacitor $C_1$ is discharged by way of the resistor $R_2$. Consequently, the inverting input terminal of the comparator COMP 1 is applied with a signal of a waveform shown in FIG. 4 at B which is derived from the pick-up output signal 8 through the sample/hold and the voltage division effected in the manner described above. When the pick-up output signal 8 is positive, the diode D2 is made conducting, whereby the non-inverting input terminal of the comparator COMP 1 is applied with the signal 8 through the voltage divider resistors $R_3$ and $R_4$. On the other hand, when the pick-up output signal 8 is negative, the diode D2 is blocked, resulting in that the non-inverting input terminal of the comparator COMP 1 is applied with a signal of a waveform shown in FIG. 4 at C. In this connection, it should be noted that since the peak value of the pick-up output signal 8 is increased in proportion to the number of revolutions of the engine, the amplitudes of the signal waveforms B and C shown in FIG. 4 will be correspondingly increased. Under the conditions, a signal waveform D is obtained through differentiation of the output signal from the comparator COMP 1 by means of a capacitor $C_4$ and the resistor $R_{20}$ and the rise-up timing of the waveform D will lead the basic ignition timing by a substantially constant angle independently from the number of rotations of the engine.

The capacitor $C_2$ is discharged during a time span between the basic ignition timing indicating signal 11 and the actual ignition command signal 12, whereby the charge signal supplied from the comparator $C_2$ in response to the actual ignition command signal is applied to the non-inverting input terminal of the comparator COMP 2. When the potential at the non-inverting input terminal of this comparator thereof, the output signal from the comparator COMP 2 takes a high level or logic "H." By differentiating this output signal "H" through the capacitor $C_5$ and the resistor $R_{21}$, there is obtained a signal (i.e. the second timing signal) representing the elapse of a predetermined time since the actual ignition as shown in FIG. 4 at E.

When the signal waveforms D and E are applied to the flip-flop 15, the masking signal illustrated in FIG. 4 at F is produced.

FIG. 5 shows a third timing signal generator circuit 14A which may be employed in place of the aforementioned second timing signal generator circuit 14 for interposing an interval corresponding to a constant crank angle in succession to the basic ignition timing.

Upon application of the pick-up signal 8 shown in FIG. 6 at G to the input of the third timing signal generator circuit 14A, a diode D3 (FIG. 5) is made conductive during a period N shown in FIG. 6, whereby the input signal is stored in a capacitor $C_3$ through a resistor $R_{14}$. During a period M shown in FIG. 6, the diode D3 is blocked, resulting in that electric charge stored in the capacitor $C_3$ is discharged through a resistor $R_{15}$. As the consequence, there is applied to the inverting input terminal of a comparator COMP 3 a signal of a waveform H which is derived from the pick-up output signal 8 through the sample and hold operation and the voltage division described just above. When the pick-up output signal 8 is negative, a diode D4 is rendered conductive, whereby the non-inverting input terminal of the comparator COMP 3 is applied with a signal of magnitude determined by the voltage divider resistor $R_{16}$ and $R_{17}$. When the pick-up output signal 8 is positive, the diode D4 is blocked, resulting in that the non-inverting input terminal of the comparator COMP 3 is applied with a signal of a waveform I shown in FIG. 6. It is noted that the peak value of the pick-up output signal 8 is increased in proportional dependence on the rotation number of the engine, involving correspondingly increased amplitudes of the signal waveforms H and I. Accordingly, the signal of a waveform J (FIG. 6) representative of the result of comparison effected by the comparator COMP 3 rises up with a substantially constant delay corresponding to a substantially constant crank angle relative to the basic ignition timing indicating signal independently from the rotation number of the engine. By applying the signal waveform J to the differentiating circuit constituted by the resistor $R_{22}$ and the capacitor $C_6$, a signal of a waveform K shown in FIG. 6 is obtained. Of course, the ignition interval differs in dependence on the number of rotation of the engine. However, according to the teaching of the invention, the masking signal is initiated at a time point preceding by a predetermined crank angle to the basic ignition timing indicated by the basic ignition timing indicating signal with a relatively simplified circuit configuration without resorting to the use of a detector proper to the detection of the crank angle. Thus, the valve-down noise produced during a predetermined period preceding to the basic ignition timing is positively prevented from being detected erroneously as the knocking signal by virtue of utilization of the masking signal mentioned above, thus making it possible to detect the knocking phenomenon with an enhanced accuracy and reliability.

We claim:

1. An ignition timing control apparatus for an internal combustion engine, comprising a pick-up incorporated in a distributor, a circuit for preparing a basic ignition timing indicating signal on the basis of an output signal from said pick-up, a knocking detector circuit for detecting presence or absence of knocking to thereby produce a knocking indicating signal, an actual ignition timing generating circuit responsive to said basic ignition timing indicating signal and said knocking indicating signal for generating an actual ignition command signal which is then applied to an igniter system of said engine, and a masking signal generator circuit responsive to the output signal from said pick-up for producing a masking signal to inhibit operation of said knocking detector circuit for a predetermined period which begins at a time point leading said basic ignition timing by a predetermined crank angle.

2. An ignition timing control apparatus for an internal combustion engine according to claim 1, wherein said masking signal generator circuit includes means for holding a peak value of the output signal of said pick-up, means for comparing said peak value with the output signal from said pick-up to thereby produce a first timing signal representative of a timing which leads the basic ignition timing by an essentially constant crank angle, and means responsive to said first timing signal for producing the masking signal representative of said predetermined period which follows said first timing signal.

3. An ignition timing control apparatus for an internal combustion engine according to claim 1 or 2, wherein said masking signal generator circuit comprises:

a first circuit responsive to the output signal from said pick-up for producing a first timing signal representative of a timing which leads said basic ignition timing by a predetermined crank angle;

a second circuit responsive to said basic ignition timing signal and said actual ignition command signal for producing a second timing signal which is delayed relative to the generation of said acutal ignition command signal by a predetermined period; and a third circuit responsive to said first and second timing signals for producing the masking signal having a duration which spans said first and said second timing signals.

4. An ignition timing control apparatus for an internal combustion engine according to claim 1 or 2, wherein said masking signal generator circuit comprises:

a first circuit responsive to the output signal from said pick-up for producing a given timing signal representative of a timing which leads the basic ignition timing by a predetermined crank angle, a second circuit responsive to the output signal from said pick-up for producing a second timing signal representative of a timing which is delayed relative to the basic ignition timing by a predetermined crank angle; and a third circuit responsive to said given and second timing signals for producing the masking signal having a duration which spans said given and said second timing signals.

5. An ignition timing control apparatus for an internal combustion engine according to claim 3, wherein said first circuit comprises first charge and discharge circuitry, first voltage dividing resistor circuitry, a first diode for applying to said charge and discharge circuitry the output signal produced from said pick-up, a second diode for applying to said first voltage dividing resistor circuitry the output signal of said first polarity produced from said pick-up, and first comparison circuitry for comparing the output signal from said first charge and discharge circuitry with the output from said first voltage dividing resistor circuitry, said second circuit comprising second charge and discharge circuitry for initiating electric charging in response to the actual ignition command signal and initiating discharging in response to said basic ignition timing indicating signal, and second comparison circuitry for comparing the output signal from said second charge and discharge circuitry with a reference value to thereby produce said second timing signal.

6. An ignition timing control apparatus for an internal combustion engine according to claim 4, wherein said second circuit comprises charge and discharge circuitry, voltage dividing circuitry, a first diode for applying the output signal of said pick-up to said charge and discharge circuitry, a second diode for applying the pick-up output signal to said voltage dividing circuitry, and comparison circuitry for comparing the output signal from said charge and discharge circuitry with the output signal from said voltage dividing circuitry to thereby produce said second timing signal.

* * * * *